Oct. 18, 1932.   A. RONNING ET AL   1,883,405
TRACTOR STRUCTURE
Original Filed Oct. 29, 1925   2 Sheets-Sheet 1
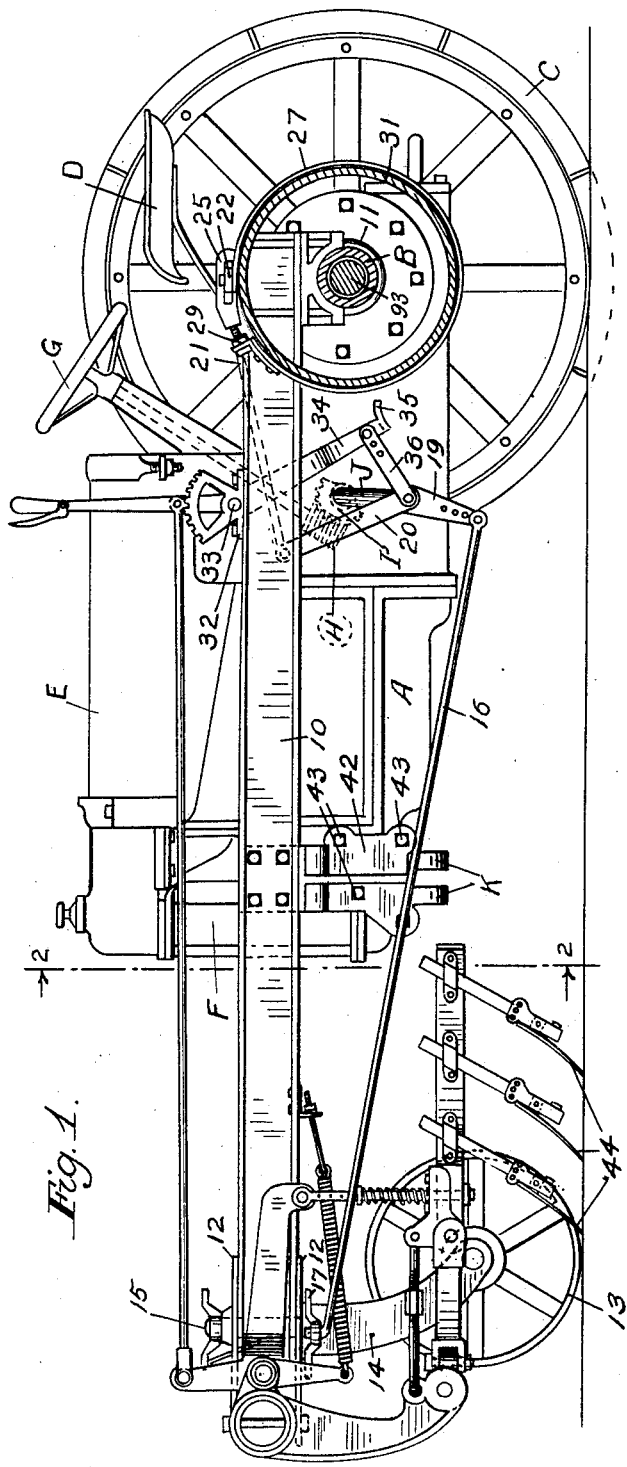
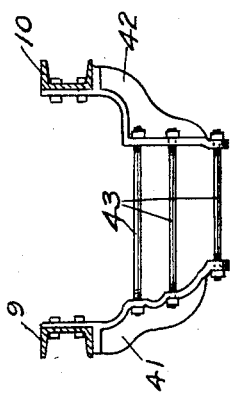
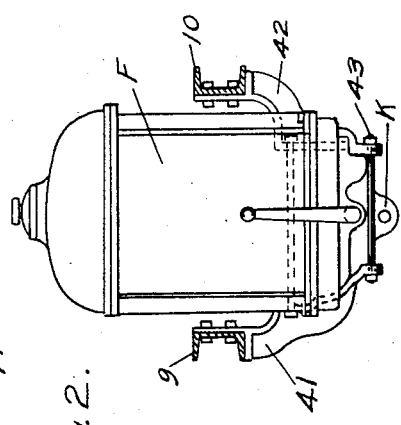
INVENTORS
ANDREAN G. RONNING
ADOLPH RONNING
BY
ATTORNEY

Fig. 4.

Patented Oct. 18, 1932

1,883,405

UNITED STATES PATENT OFFICE

ADOLPH RONNING, OF MINNEAPOLIS, MINNESOTA, AND ANDREAN G. RONNING, DECEASED, LATE OF MINNEAPOLIS, MINNESOTA, BY ADOLPH RONNING, OF MINNEAPOLIS, MINNESOTA, AND JACOB A. RONNING, OF MINNEAPOLIS, MINNESOTA, EXECUTORS, ASSIGNORS, BY MESNE ASSIGNMENTS, TO ADOLPH RONNING, AND ADOLPH RONNING AND JACOB A. RONNING, TRUSTEES, OF THE ESTATE OF ANDREAN G. RONNING, DECEASED, ALL OF MINNEAPOLIS, MINNESOTA

TRACTOR STRUCTURE

Original application filed October 29, 1925, Serial No. 65,700. Divided and this application filed December 19, 1928. Serial No. 327,139.

This invention relates to implement attachments for tractors, and the main object is to provide means of a novel, efficient, and practical nature for converting a standard or well known type of tractor into a combination machine, wherein the usual forecarriage of the tractor is substituted for a wheeled, implement bearing frame, thus producing a machine in which a single operator may have full and easy access to both the tractor controls and the implement adjusting mechanisms. Machines of this general character, carrying implements such as plows, grader blades, cultivators and the like are now well known in the art, and are illustrated in the co-pending Ronning and Ronning application, Ser. No. 451,746, filed March 12, 1921, for traction implement, now Patent No. 1,706,256 and in various divisions of said application, one of which divisions has since matured into Patent No. 1,658,354, issued February 7, 1928. In all of said disclosures, as well as in similar structures disclosed by others in the art, prior to the present invention, it has been customary to attach a yoke of the implement frame to the lugs, at the front of the tractor, to which lugs the front axle was attached, prior to the conversion of the tractor to a traction-implement. As a result it was necessary to jack or block up the front end of the tractor while the front wheels and axle were being removed and until after the implement frame was securely fastened, which operation required the expenditure of a considerable amount of labor and time. In the present instance, however, the implement frame is so designed that it can be applied and secured to the tractor while the usual tractor forecarriage is still in place, and consequently it becomes a simple matter to convert the tractor because the wheels can be removed after the frame is attached, and, conversely, it is an equally simple operation to reconvert the tractor to its normal condition, as its usual steering wheels can be quickly replaced before the implement frame is detached.

Other objects will appear and be discussed in the course of the following specification, reference being had to the accompanying drawings, forming a part thereof.

It may here be noted that the present application is a division of a co-pending application Ser. No. 65,700, filed October 29, 1925, for tractor cultivator.

Referring to the drawings:

Fig. 1 is a left side elevation of the machine, the near rear wheel being removed for purpose of illustration.

Fig. 2 is a sectional elevation on the line 2—2 in Fig. 1.

Fig. 3 is a sectional elevation similar to Fig. 2, but with the tractor unit omitted.

Fig. 4 is a plan view of the machine as seen in Fig. 1.

Referring to the drawings by reference characters, A designates the body casting or main frame of a common and well known type of tractor having rear axle and differential housings B, rear drive wheels C, a driver's support D, fuel tank E, and radiator F. A hand wheel G operates through a worm H and gear segment I to oscillate a crank J which is normally connected with and arranged to operate the steering carriage which is tiltably connected to a forked coupling bracket K to support the front end of the tractor when the same is used as a traction unit only. In converting the tractor into a tractor-implement the usual steering carriage and its connections with the crank J are dispensed with and removed. This converting feature is fully disclosed and more broadly covered and described in aforesaid Patent No. 1,658,354.

The front end of the tractor, from which the normal steering carriage has been removed, is now supported, as in the above mentioned applications, by being suspended from and connected to a supplemental frame or substituted forecarriage, which, in the present instance comprises a pair of side bars 9 and 10, the rear ends of which are rigidly secured, as by U-bolt clamps 11, to the rear axle housings B. The bars converge slightly toward their forward ends where they are suitably connected, by plate members 12. The forward end of the supplemental frame is supported by a castor like wheel 13 having a fork 14 which is pivoted, on a vertical pivot 15, in the frame, and the pivot center is in advance of a vertical plane passing through the axis of the wheel, so that when the fork is turned (on the pivot 15) it will not only angle the wheel to effect steering, but will, previously thereto, first shift or swing the front end of the frame to the side to which the steering is directed, i. e., the frame will swing as far as the center 15 will swing from the spot on which the wheel 13 rests upon the ground. This swinging or shifting of the frame is very important, especially where ground working tools such as cultivators are carried by the frame, as it affords a very convenient and sensitive means for quickly shifting the tools transversely, without waiting for the angled wheel to move the frame sidewise as the machine moves forward through the field.

The wheel 13 is steered from the rear of the machine by means of a rod 16, which is connected at its front end to a rack member 17, which meshes with a pinion 18 on the fork 14. The rear end of the rod 16 is pivotally and adjustably connected to the short or lower arm 19 of a bent lever 19—20, carried on the crank J. The arm 20, in turn, is connected by a link rod 21 to a lever bar 22, which is pivoted, as at 23, to a transverse beam 24 secured upon the rear ends of the side bars 9 and 10. Slotted castings 25, at the ends of the beam 24, permit a restricted oscillating movement of the lever 22 on its pivot 23. The ends of the lever 22 are secured to the free ends of a pair of externally acting brake bands 26 and 27, the other ends of which are adjustably secured to the castings 25, as at 28 and 29. These bands 26 and 27 are arranged to frictionally engage drums 30 and 31, to stop or retard either of the wheels C, but can only act on one drum at a time due to the fact that the lever 22 is pivoted between its ends.

Journalled in bearings 32 on the beams 9—10 is a transverse shaft 33, upon the left side of which is non-rotatably secured a lever 34 having a pedal 35, said lever being connected by a link 36 to the crank J. The right end of the shaft 33 is provided with a pinion 37, which meshes with the gear segment 38 of a right foot lever 39 having a pedal 40, the effect of this gearing being to alternate or reverse the movements of the levers 34 and 39, and the object of the pedal arrangement is to enable the operator to use either his hands or his feet (or both if necessary) to steer the machine and guide the tools. The steering operation may be briefly described as follows:

If the machine is to be angled from its normal forward direction, for instance to the left, the operator may either turn the hand wheel G to the left or may press the pedal 35 with his foot, either action resulting in a forward movement of the crank J. The bent lever 19—20 now acts as an equalizer between the bars 16 and 21, but, with the fulcrum (J) of the lever moving forwardly it will be seen that the bar 16 will move forwardly, and by virtue of the gearing 17—18 will angle the wheel 13 to the left, and at the same time, by pulling on the rod 21, will tighten the brake band 27, thus braking the left wheel C. As the two wheels C are driven through the customary differential mechanism the right wheel will be speeded up, causing the tractor to swing more sharply to the left behind the guiding wheel 13, and permitting the entire machine to pivot, if necessary, on the left wheel C. To return the machine to its forward direction it is only necessary to release the hand wheel G or pedal 35, upon which the wheel 13 will automatically return to its trailing or straight position behind the pivot center 15. To turn the machine to the right the operator either swings the wheel G or depresses the pedal 40. This turns the shaft 33 and pulls the crank J rearwardly, thus reversing the above described action on the rods 16 and 21, and angles the wheel 13 to the right while braking the right wheel C.

In each of the co-pending applications resulting in Patents No. 1,706,256 and No. 1,658,354, the front end of the tractor was suspended from the frame bars by providing an underslung yoke, the ends of which were secured to the bars while the intermediate or lower central portion had a flange which was secured in the coupling bracket (as K) by a pin or bolt. Such a construction, although very simple and practical, necessitated the use of a jack or other means for supporting the front end of the tractor while the front axle was being removed and the yoke applied. In the present instance means are provided whereby the tractor may be secured, with respect to the frame, while still supported on the usual forecarriage, and such means may be briefly described as follows:

A pair of brackets or castings 41 and 42 are secured, respectively, to the frame beams 9 and 10. These castings are preferably shaped so as to conform with the shape of the lower side portions of the front end of the tractor, so as to snugly receive the same, and are connected by bolts 43, which pass under or through the tractor, so as to tie the brackets rigidly together. It may be noted that the two lower bolts 43 pass in front and behind of the coupling members K, and by so doing may be secured while the front axle (not shown) is still in place, and, conversely, when the frame is to be removed the normal steering carriage or front axle may be first applied, after which the bolts 43 and the entire framework may be readily removed.

It may be here noted that when the frame and usual fore-carriage are to be substituted, one for the other, it may be found that the front end of the tractor may be a little too high or too low to properly receive the brackets 51—42, or it may be too low to readily permit the removal of the fore-carriage after the frame has been attached. In this event the necessary attaching and removing operations may be easily effected by merely running the tractor over an uneven surface until its front support, i. e., either the caster 13 or the usual forecarriage, is raised or lowered to the degree required.

Figure 4:
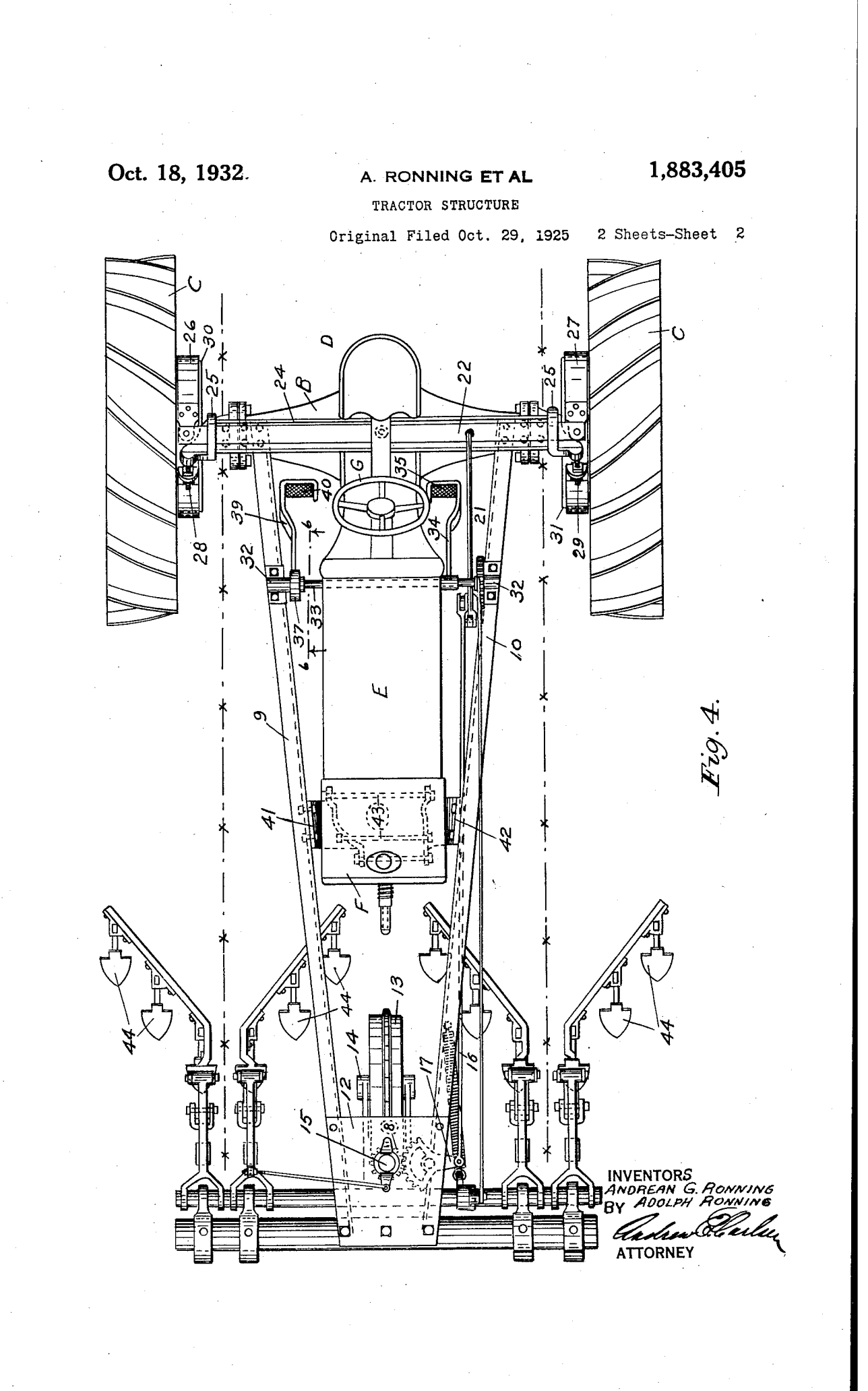

To show a practical application of the various devices herein set forth and claimed Figs. 1 and 4 illustrate how gangs of cultivator tools 44 may be attached to and adjustably carried by the supplemental frame. This mechanism, however, is purely illustrative, and will not be described in detail, especially so as such mechanism and its association with the tractor features forms the subject matter of application Ser. No. 65,700, of which this is a division.

It is understood that suitable modifications of the structure herein set forth may be made if within the spirit and scope of the appended claims. Having now therefore fully illustrated and described the invention what is claimed to be new is:—

What is claimed is:

1. An attachment for a tractor comprising a wheel supported frame adapted to be substituted for the normal steering wheel axle of the tractor so as to support the front end of the tractor with said axle removed, and said frame having support devices with means for attaching such devices to the front end of the tractor at points spaced from the point of attachment of said axle, before being removed, so that said devices may be secured to the tractor before said steering wheel axle has been removed.

2. An attachment for a tractor comprising a wheel supported frame adapted to be substituted for the normal fore-carriage of the tractor so as to support the front end of the tractor with said forecarriage removed, and means adapted to connect said front end of the tractor to the frame before said forecarriage has been removed, said means comprising a pair of bracket members carried by the frame and means for securing said bracket members to the front end of the tractor.

3. An attachment adapted to be applied to a tractor, comprising a frame adapted to support the front end of the tractor as a substitute for the normal steering wheels and front axle of the tractor, said frame having side bars secured at their rear ends to the rear end of the tractor, steering means supporting the front end of the frame, a device extending from intermediate portions of the side bars for attachment to the front of the tractor at a point spaced from the point of attachment by the said front axle whereby to support the tractor when said normal steering wheels and front axle are removed, and means for so attaching said connecting means to the fore end of the tractor whereby said frame may be secured in position to the tractor while the front end of the tractor is still supported by the normal steering wheels and front axle.

4. An attachment for a power unit of a tractor comprising side bars extending along the sides of the unit and attached at their rear ends thereto, a wheeled support for the front end of the frame, a pair of depending bracket members rigidly secured to the side bars adjacent the front end of the power unit, and means for rigidly securing said bracket members to the sides of the power unit to support the same in the frame.

5. An attachment for a power unit of a tractor comprising side bars extending along the sides of the unit and attached at their rear ends thereto, a wheeled support for the front end of the frame, a pair of depending bracket members rigidly secured to the side bars adjacent the front end of the power unit, and a plurality of bolts for rigidly connecting the bracket members to the power unit.

6. An attachment for a power unit of a tractor comprising side bars extending along the sides of the unit and attached at their rear ends thereto, a wheeled support for the front end of the frame, a pair of depending bracket members rigidly secured to the side bars adjacent the front end of the power unit, and a series of tie bolts connecting the bracket members and serving to clamp them against opposite sides of the power unit.

7. The combination with a tractor power unit having a coupling bracket at its forward end designed to receive the normal axle of a forecarriage, of a frame having side bars secured at their rear ends to the power unit and extending with their front ends in advance of the tractor, a wheeled support for the front end of the frame, and means extending from the frame for attachment to the power unit at a point removed from the coupling bracket, whereby the power unit may be supported from the frame while the said normal axle is being removed from or applied to the coupling bracket.

8. A frame attachment for a tractor comprising side bars extending along the sides of the tractor at their rear ends to the rear axle housing of the tractor, a support for the front end of the frame, spaced bracket members secured to the side bars, and means for securing the bracket members against opposite sides of the front end of the tractor.

Signed at Minneapolis, Minnesota, this 17th day of December, 1928.

ADOLPH RONNING.
ADOLPH RONNING,
JACOB A. RONNING,
*As Joint Executors of the Estate of Andrean G. Ronning, Deceased.*